(12) United States Patent
Gale et al.

(10) Patent No.: US 10,271,515 B2
(45) Date of Patent: Apr. 30, 2019

(54) ANIMAL FEED CATCH TRAY AND ANIMAL FEEDER COMPRISING SAME

(71) Applicants: Jason R. Gale, San Antonio, TX (US); Heath A. Nickes, Round Mountain, TX (US)

(72) Inventors: Jason R. Gale, San Antonio, TX (US); Heath A. Nickes, Round Mountain, TX (US)

( * ) Notice: Subject to any disclaimer, the term of this patent is extended or adjusted under 35 U.S.C. 154(b) by 479 days.

(21) Appl. No.: 15/079,260

(22) Filed: Mar. 24, 2016

(65) Prior Publication Data

US 2017/0273275 A1    Sep. 28, 2017

(51) Int. Cl.
| | | |
|---|---|---|
| *A01K 5/00* | (2006.01) | |
| *A01K 5/02* | (2006.01) | |
| *A01K 39/01* | (2006.01) | |
| *A01K 5/01* | (2006.01) | |
| *A01K 39/012* | (2006.01) | |

(52) U.S. Cl.
CPC .......... *A01K 5/0135* (2013.01); *A01K 5/0225* (2013.01); *A01K 39/012* (2013.01)

(58) Field of Classification Search
CPC .. A01K 5/0225; A01K 39/012; A01K 1/0356; A01K 45/00; A01K 5/0114; A01K 5/0135
USPC ................. 119/52.1, 61.2, 61.57, 464, 467
See application file for complete search history.

(56) References Cited

U.S. PATENT DOCUMENTS

| | | | | |
|---|---|---|---|---|
| 1,380,564 | A | | 6/1921 | Kennedy |
| 2,699,752 | A | * | 1/1955 | Reyes ................. A01K 1/0356 |
| | | | | 119/464 |
| 3,720,184 | A | * | 3/1973 | Pearce ................ A01K 5/0225 |
| | | | | 119/51.5 |
| 3,763,826 | A | * | 10/1973 | Portelli ............... A01K 5/0114 |
| | | | | 119/52.1 |
| 4,303,039 | A | | 12/1981 | Thibault |
| 4,315,483 | A | | 2/1982 | Scheidler |
| 4,735,171 | A | | 4/1988 | Essex |
| 4,955,321 | A | | 9/1990 | Waldner |
| 5,062,388 | A | | 11/1991 | Kilham |
| 5,699,753 | A | | 12/1997 | Alridge |
| 5,771,838 | A | * | 6/1998 | Bloom ................ A01K 39/012 |
| | | | | 119/464 |
| 5,992,349 | A | * | 11/1999 | Sachs .................. A01K 5/0225 |
| | | | | 119/52.1 |
| 6,659,040 | B1 | | 12/2003 | Decker |

(Continued)

*Primary Examiner* — Yvonne R Abbott-Lewis

(74) *Attorney, Agent, or Firm* — David O. Simmons; IVC Patent Agency

(57) ABSTRACT

The present invention is directed to animal feeders and implements therefor that are configured to limit the waste of feed from the animal feeder. Preferably, such implements can be in the form of an apparatus that is attached to an existing gravity fed or assisted feed animal feeder for catching feed that would otherwise fall to the ground from a feed delivery structure of the animal feeder. Beneficially, by limiting wasting of feed, embodiments of the present invention reduce feed cost and reduce the presence of undesirable animals that would otherwise be attracted by wasted feed. Feed catch trays configured in accordance with embodiments of the present invention can also include structure for receiving and holding a dietary supplement article such as, for example, a block of minerals whose consumption is beneficial to animals being fed.

17 Claims, 4 Drawing Sheets

(56) References Cited

U.S. PATENT DOCUMENTS

| | | | |
|---|---|---|---|
| 6,681,781 B2 | 1/2004 | Puri et al. | |
| 7,392,763 B2 * | 7/2008 | Willinger | A01K 45/00 |
| | | | 119/464 |
| 7,891,317 B2 | 2/2011 | Bodenstab et al. | |
| 8,011,322 B1 * | 9/2011 | Jackson | A01K 39/012 |
| | | | 119/52.2 |
| D704,384 S * | 5/2014 | Worsley | D30/121 |
| 8,857,373 B2 * | 10/2014 | Jenkins | A01K 5/0225 |
| | | | 119/52.1 |
| 2006/0081189 A1 | 4/2006 | Tippetts | |
| 2014/0209031 A1 | 7/2014 | Norris | |
| 2015/0181801 A1 | 7/2015 | Niemela et al. | |
| 2018/0125030 A1 * | 5/2018 | Glover | A01K 5/0225 |

* cited by examiner

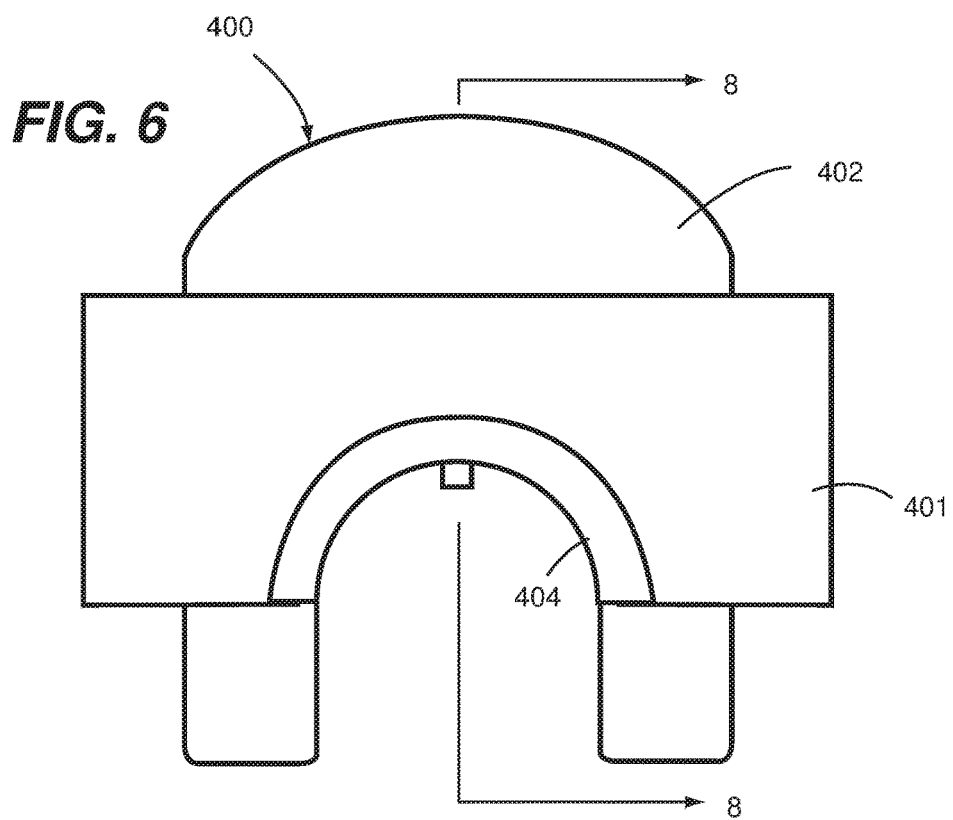
FIG. 6
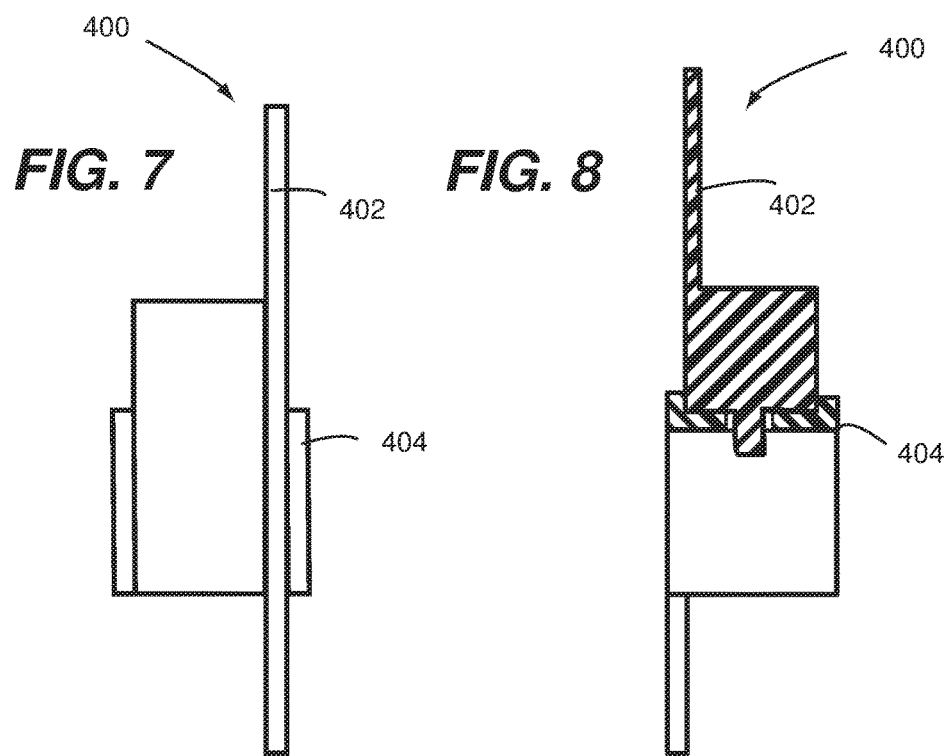
FIG. 7
FIG. 8

ANIMAL FEED CATCH TRAY AND ANIMAL FEEDER COMPRISING SAME

FIELD OF THE DISCLOSURE

The disclosures made herein relate generally to animal feeding apparatuses and systems and, more particularly, to animal feeders having a feed catch structure for catching feed falling from a feed dispensing portion thereof.

BACKGROUND

Animal feeders for use in activities such as, for example, breeding and hunting of animals (e.g., deer and the like) are well known. Such animal feeders typically have a feed reservoir connected to a feed delivery structure thereby allowing feed to flow in a controlled manner from the feed reservoir through a feed delivery passage of the feed delivery structure to a feed access opening of the fed delivery structure. Feed flow can be under the force of gravity (i.e., gravity fed) or a mechanized device (i.e., assisted feed) that forcibly pushes the feed. Once at the feed access opening, an animal can consume feed that is at the feed access opening and such consumption can cause replenishment of feed at the feed access opening.

A well known shortcoming of animal feeders is wastage of feed. Such feed wastage can result from feed falling from the feed delivery structure to the ground during consumption by an animal, over-flow during replenishment, wind, and the like. This wasted feed has the drawback of attracting undesired animals (e.g., mice, rats, raccoons, and the like) and adding to feed costs. Therefore, a solution that limits the waste of feed from an animal feeder would be advantageous, desirable and useful.

SUMMARY OF THE DISCLOSURE

Embodiments of the present invention are directed to animal feeders. More specifically, embodiments of the present invention are directed to limiting the waste of feed from an animal feeder. In preferred embodiments, an apparatus is attached to an existing gravity fed or assisted feed animal feeder for catching feed that would otherwise fall to the ground from a feed delivery structure of the animal feeder. Beneficially, by limiting wasting of feed, such an apparatus reduces feed cost and reduces the presence of undesirable animals that would otherwise be attracted by wasted feed.

In one embodiment of the present invention, a feed catch tray apparatus for an animal feeder comprises a mounting structure having a feed chute receiving space configured for having a feed chute of an animal feeder located therein and a feed catch tray attached to the mounting structure. A feed catch portion of the feed catch tray extends below the feed chute receiving space.

In another embodiment of the present invention, a catch tray system for an animal feeder comprises a feed chute mount and a feed catch tray. The feed chute mount has a feed chute engaging portion and a feed catch tray engaging portion. The chute engaging portion is configured for receiving a feed chute of a particular cross-sectional shape. The feed catch tray includes a feed chute engaging portion matingly and releasably engagable with the feed catch tray engaging portion of the feed chute mount. A feed catch portion of the feed catch tray extends below the feed chute engaging portion. The feed catch portion of the feed catch tray includes a feed collection space defined by one or more side walls and a bottom wall of the feed catch tray. The bottom wall includes a plurality of spaced apart dietary supplement article supporting structures extending thereabove.

In another embodiment of the present invention, an animal feeder comprises a feed hopper, a feed chute, and a feed catch apparatus. The feed hopper has a feed storage space therein. The feed chute has a first end portion and a second end portion. The first end portion is attached to the feed hopper. A feed passage extends between the first end portion and the second end portion. The feed passage intersects the feed storage space for allowing feed to from feed storage space to flow through the feed chute to a feed access opening at the second end portion of the feed chute. The feed catch apparatus is attached to the feed chute. A feed catch portion of the feed catch apparatus extends below the feed access opening of the feed chute. The feed catch portion of the feed catch apparatus includes a feed collection space defined by one or more side walls and a bottom wall of the feed catch tray.

These and other objects, embodiments, advantages and/or distinctions of the present invention will become readily apparent upon further review of the following specification, associated drawings and appended claims.

BRIEF DESCRIPTION OF THE DRAWINGS

FIG. 6 is a front plan view showing a water shield for feed catch tray apparatus configured in accordance with an embodiment of the present invention.

FIG. 7 is a side view of the upper clamp shown in FIG. 6.

FIG. 8 is a cross-sectional view taken along the line 8-8 in FIG. 6.

DETAILED DESCRIPTION

Figure 1:
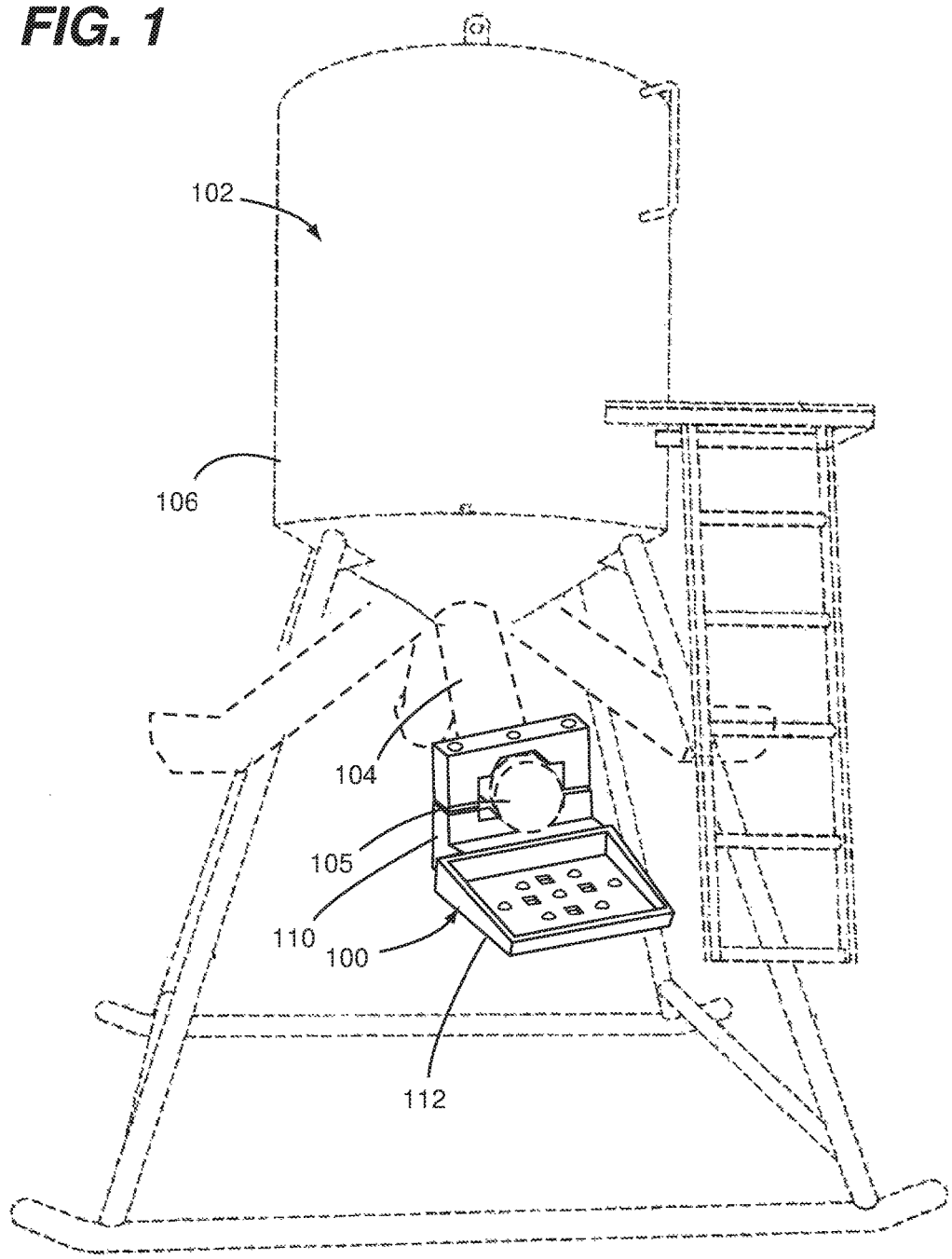
FIG. 1 is a perspective view showing a feed catch tray apparatus configured in accordance with an embodiment of the present invention, which is mounted on a feed chute of an animal feeder.
Figure 2:
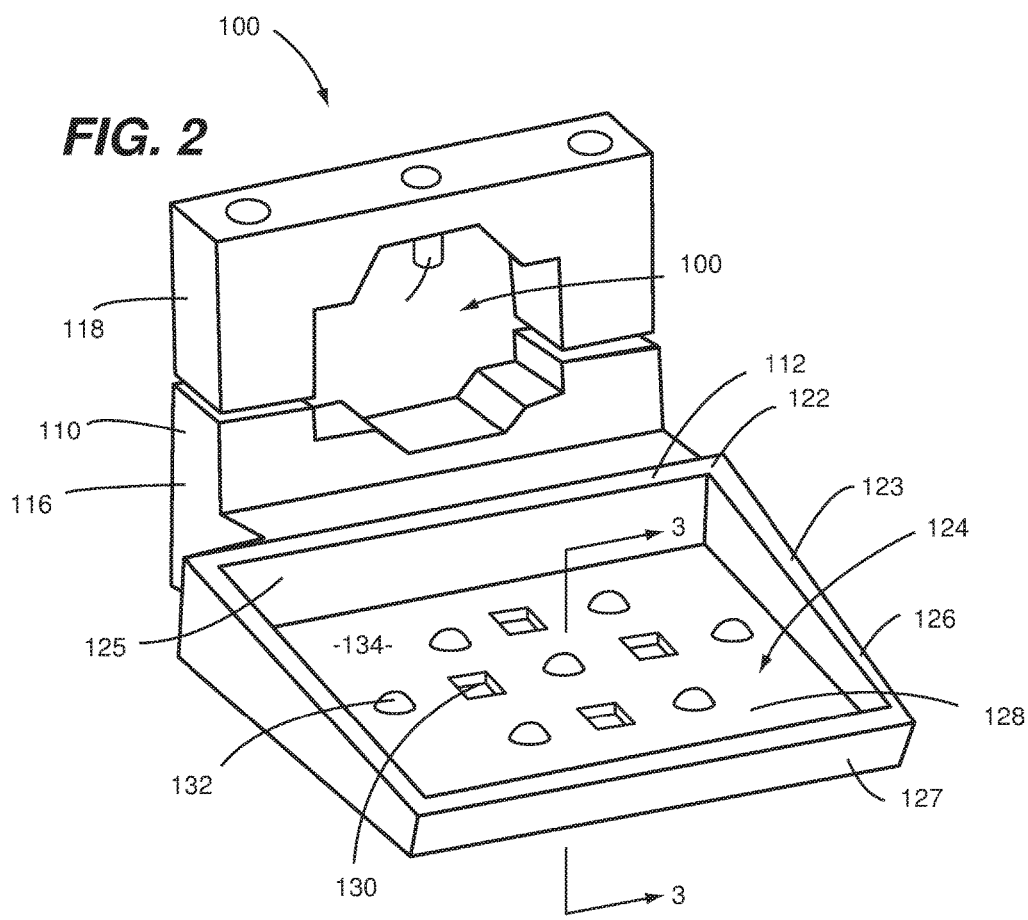
FIG. 2 is an enlarged perspective view showing the feed catch tray apparatus of FIG. 1.

A feed catch tray apparatus 100 is shown in FIGS. 1 and 2. The feed catch tray 100 can be attached to an existing gravity fed or assisted feed animal feeder 102 for catching feed that would otherwise fall to the ground from a feed chute 104 (i.e., a feed delivery structure) of the animal feeder 102, thereby limiting the waste of feed. Such wasted feed can result from feed falling from a to the ground during consumption by an animal, over-flow during replenishment of feed from a hopper 106 to the feed delivery structure 104, and the like. A feed passage extends between a first end portion and a second end portion of the feed chute 104 and intersects with a feed storage space of the hopper 106 for allowing feed to flow from feed storage space through the feed chute 104 to a feed access opening 105 at the second end portion of the feed chute 104. Beneficially, by limiting wasting of feed, the feed catch tray apparatus 100 reduces feed cost and reduces the presence of undesirable animals that would otherwise be attracted by wasted feed. Furthermore, the feed catch tray apparatus 100 promotes health of the animals being fed by allowing such animals to consume a dietary supplement such as, for example, minerals in addition to consuming feed.

The feed catch tray apparatus 100 includes a mounting structure 110 and a feed catch tray 112 attached to the mounting structure 110. The mounting structure 110 has a feed chute receiving space 114 configured for having the feed chute 104 located therein to attach the feed catch tray apparatus 100 to the animal feeder 102. The mounting structure 110 can include a base portion 116 and an upper clamp 118 that jointly define the feed chute receiving space 114. In preferred embodiments, the feed chute receiving space 114 has a configuration that promotes a secure interface between the mounting structure 110 and the feed chute 104. Such configuration can include a shape and size of the feed chute receiving space 114 promoting beneficial surface contact between the mounting structure 110 and the feed chute 104. To accommodate different shape feed chutes, the feed chute receiving space can be defined by a first set of surfaces jointly configured for engaging a feed chute having a first cross-sectional shape (e.g., a round cross-sectional profile) and by a second set of surfaces jointly configured for engaging a feed chute having a second cross-sectional shape (e.g., a rectangular cross-sectional profile). Such configuration can also include the base portion 116 and/or the upper clamp 118 having a positioning member 120 (e.g., pin or setscrew) that engages the feed chute 104 (e.g., an exterior surface thereof or a hole thereon) to positively position the mounting structure 110 relative to the feed chute 104.

The feed catch tray 112 includes a feed catch portion 122 that extends below the feed chute receiving space 114. The feed catch portion 122 can include a feed collection space 124 defined by opposing side walls 123, a rear wall 125, a front wall one 127 and a bottom wall 128. The side walls 123 can be tapered such that the front wall 127 is shorter than the rear wall 125 thereby enhancing access to the feed collection space 114 by an animal.

Figure 3:
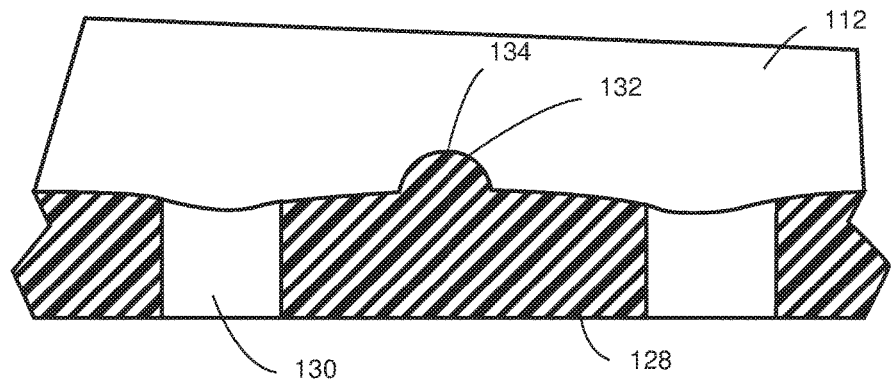
FIG. 3 is a cross-sectional view taken along the line 3-3 in FIG. 2.

The bottom wall 128 can include one or more liquid drain holes 130 extending therethrough and a plurality of spaced apart dietary supplement article supporting structures 132 extending thereabove. The one or more liquid drain holes 130 and the plurality of spaced apart dietary supplement article supporting structures 132 are preferably within an area defined by the one or more sidewalls 126. The one or more liquid drain holes 130 allow for drainage of liquid (e.g., rain water) from within the feed collection space 124 and the plurality of spaced apart dietary supplement article supporting structures 132 allow for air and water to flow under a dietary supplement article (e.g., a mineral block) to maintain its dryness and freshness. To this end, as shown in FIG. 3, a top surface 134 of the bottom wall 128 can be contoured to promote the flow of liquid thereon toward the one or more liquid drain holes. In such embodiments where the top surface 134 of the bottom wall 128 is contoured, a dietary supplement article engaging portion of each one of the dietary supplement article supporting structures 132 lay within in a common plane, thereby allowing them to jointly engage a substantially flat surface of the dietary supplement article even though the bottom wall 128 is contoured.

Figure 4:
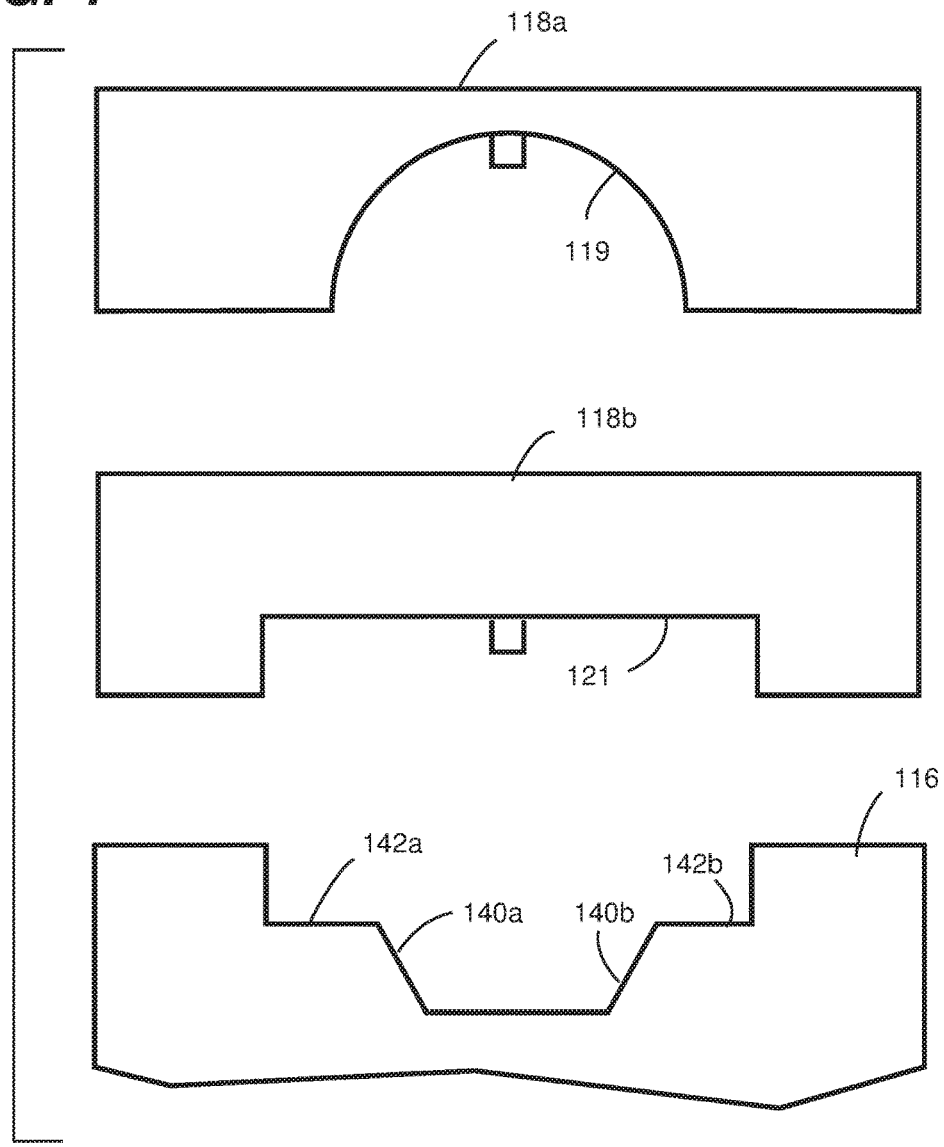
FIG. 4 is an elevation view showing a mounting structure arrangement for a feed catch tray apparatus configured in accordance with an embodiment of the present invention.

Referring now to FIG. 4, an alternate implementation of the mounting structure 110 discussed above in reference to FIGS. 1 and 2 is shown. The base portion 116 includes a first set of feed tube engaging surfaces 140a, 140b configured for engaging a feed chute with a round cross-sectional profile and a second set of feed tube engaging surfaces 142a, 142b configured for engaging a feed chute with a rectangular cross-sectional profile. This alternate implementation of the mounting structure 110 has upper clamps that are specific to a particular cross-sectional shape 118 of a feed chute. A round feed chute specific upper clamp 118a has a feed tube engaging surface 119 corresponding specifically to a feed chute having a round cross-sectional shape and a rectangular feed chute specific upper clamp 118b has a feed tube engaging surface 121 corresponding specifically to a feed chute having a round cross-sectional shape.

Figure 5:
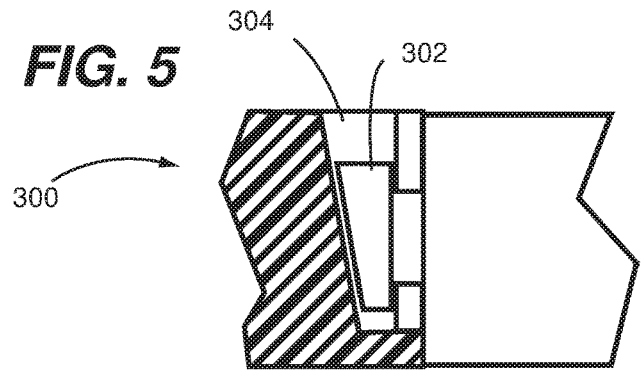
FIG. 5 is a cross-sectional view showing a mounting structure interlock of a feed catch tray apparatus configured in accordance with an embodiment of the present invention.

FIG. 5 shows a mounting structure interlock 300 for a feed catch tray apparatus configured in accordance with an embodiment of the present invention (e.g., the feed catch tray apparatus 100). The mounting structure interlock 300 allows different configuration mounting structures to be readily engaged with and disengaged from a feed catch tray. Beneficially, such a construction allows a single configuration of feed catch tray to be used with any number of different mounting structures thereby providing a feed catch tray system comprising a feed catch tray and at least one mounting structure that is attachable to the feed catch tray. The mounting structure interlock 300 includes a feed chute engaging portion 302 that is in combination with the mounting structure and a feed catch tray engaging portion 304 that is in combination with the feed catch tray. The feed chute engaging portion 302 is matingly and releasably engagable with the feed catch tray engaging portion 304. For example, the feed chute engaging portion 302 is engagable with the feed catch tray engaging portion 304 though a tapered interlocking interface such as, for example, a tapered dovetail that is received within a corresponding tapered pocket. To limit the potential for unintended separation, a locking member such as a threaded fastener or pin can be used to preclude the feed chute engaging portion 302 from being displaced relative to the feed catch tray engaging portion 304 after that are engaged with each other.

FIGS. 6-8 show various aspects of a water shield 400 for feed catch tray apparatus configured in accordance with an embodiment of the present invention. The water shield 400 can be integral with an upper clamp 401 of the mounting structure of the feed catch tray apparatus such that it extends above the feed chute receiving space of the mounting structure. The water shield 400 serves the purpose of diverting water that would otherwise flow down the feed chute of an animal feeder upon which the feed catch tray apparatus is attached and fall onto its feed catch portion 122, thereby potentially deteriorating any feed and/or a nutrient supplement thereon. The water shield 400 can include a water deflection member 402 that diverts water running down the feed chute and that shields the spray of water dripping only the feed tube such as from the hopper. The water shield 400 can also include an interface seal 404 that provides a water resistant barrier between the upper clamp 401 and the feed chute. Regardless of the specific configuration, a water shield in accordance with the present invention will reduce the amount of water flowing or falling ton to the feed chute receiving space of the feed catch tray apparatus.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in all its aspects. Although the invention has been described with reference to particular means, materials and embodiments, the invention is not intended to be limited to the particulars disclosed; rather, the invention extends to all functionally equivalent technologies, structures, methods and uses such as are within the scope of the appended claims.

What is claimed is:

1. A feed catch tray apparatus for an animal feeder, comprising:
a mounting structure having a feed chute receiving space configured for having a feed chute of an animal feeder located therein; and
a feed catch tray attached to the mounting structure, wherein a feed catch portion of the feed catch tray extends below the feed chute receiving space;
wherein the feed catch portion of the feed catch tray includes a feed collection space defined by one or more sidewalls and a bottom wall of the feed catch tray; and
wherein the bottom wall includes one or more liquid drain holes extending therethrough and a plurality of spaced apart dietary supplement article supporting structures extending thereabove.

2. The feed catch tray apparatus of claim 1 wherein the one or more liquid drain holes and the plurality of spaced apart dietary supplement article supporting structures are within an area defined by the one or more sidewalls.

3. A feed catch tray apparatus for an animal feeder, comprising:
a mounting structure having a feed chute receiving space configured for having a feed chute of an animal feeder located therein, wherein the mounting structure includes a water shield extending above the feed chute receiving space; and
feed catch tray attached to the mounting structure, wherein a feed catch portion of the feed catch tray extends below the feed chute receiving space.

4. The feed catch tray apparatus of claim 3 wherein the feed chute receiving space includes:
a first set of surfaces jointly configured for engaging a feed chute having a round cross-sectional profile; and
a second set of surfaces jointly configured for engaging a feed chute having a rectangular cross-sectional profile.

5. The feed catch tray apparatus of claim 3 wherein:
the feed catch portion of the feed catch tray includes a feed collection space defined by one or more side walls and a bottom wall of the feed catch tray;
the bottom wall includes one or more liquid drain holes extending therethrough and a plurality of spaced apart dietary supplement article supporting structures extending thereabove; and
the one or more liquid drain holes and the plurality of spaced apart dietary supplement article supporting structures are within an area defined by the one or more side walls.

6. The feed catch tray apparatus of claim 5 wherein:
the feed catch portion of the feed catch tray includes opposing side walls, a rear wall and a front wall; and
the side walls are tapered such that the front wall is shorter than the rear wall thereby enhancing access to the feed collection space.

7. A feed catch tray apparatus for an animal, comprising:
a mounting structure having a feed chute receiving space configured for having a feed chute of an animal feeder located therein; and
a feed catch tray attached to the mounting structure, wherein a feed catch portion of the feed catch tray extends below the feed chute receiving space, wherein the feed chute receiving space includes a first set of surfaces jointly configured for engaging a feed chute having a round cross-sectional profile and a second set of surfaces jointly configured for engaging a feed chute having a rectangular cross-sectional profile.

8. A feed catch tray apparatus for an animal, comprising:
a mounting structure having a feed chute receiving space configured for having a feed chute of an animal feeder located therein; and
a feed catch tray attached to the mounting structure, wherein a feed catch portion of the feed catch tray extends below the feed chute receiving space, wherein the feed catch portion of the feed catch tray includes a feed collection space defined by one or more side walls and a bottom wall of the feed catch tray, the bottom wall includes one or more liquid drain holes extending therethrough and a top surface of the bottom wall is contoured to promote flow of liquid thereon toward the one or more liquid drain holes.

9. The feed catch tray apparatus of claim 8 wherein:
the bottom wall includes a plurality of spaced apart dietary supplement article supporting structures extending above the top surface thereof; and
a dietary supplement article engaging portion of each one of the dietary supplement article supporting structures lying in a common plane.

10. The feed catch tray apparatus of claim 8 wherein the mounting structure includes a water shield extending above the feed chute receiving space.

11. A catch tray system for an animal feeder, comprising:
a feed chute mount having a feed chute engaging portion and a feed catch tray engaging portion, wherein the chute engaging portion is configured for receiving a feed chute of a particular cross-sectional shape; and
a feed catch tray including a feed chute engaging portion matingly and releasably engagable with the feed catch tray engaging portion of the feed chute mount, wherein a feed catch portion of the feed catch tray extends below the feed chute engaging portion, wherein the feed catch portion of the feed catch tray includes a feed collection space defined by one or more side walls and a bottom wall of the feed catch tray, and wherein the bottom wall includes a plurality of spaced apart dietary supplement article supporting structures extending thereabove.

12. The catch tray system of claim 11 wherein the feed chute mount includes a water shield extending above the feed chute engaging portion.

13. The catch tray system of claim 11 wherein:
the feed catch portion of the feed catch tray includes opposing side walls, a rear wall and a front wall; and
the side walls are tapered such that the front wall is shorter than the rear wall thereby enhancing access to the feed collection space.

14. The catch tray system of claim 11 wherein:
the feed chute engaging portion includes a feed chute receiving space; and
the feed chute receiving space includes a first set of surfaces jointly configured portion for engaging a feed chute having a round cross-sectional profile and a second set of surfaces jointly configured portion for engaging a feed chute having a rectangular cross-sectional profile.

15. The catch tray system of claim 14 wherein:
the feed catch portion of the feed catch tray includes opposing side walls, a rear wall and a front wall; and
the side walls are tapered such that the front wall is shorter than the rear wall thereby enhancing access to the feed collection space.

16. An animal feeder, comprising:

a feed hopper having a feed storage space;

a feed chute having a first end portion and a second end portion, wherein the first end portion is attached to the feed hopper, wherein a feed passage extends between the first end portion and the second end portion and wherein the feed passage intersects the feed storage space for allowing feed to flow from feed storage space through the feed chute to a feed access opening at the second end portion of the feed chute; and a feed catch apparatus attached to the feed chute, wherein a feed catch portion of the feed catch apparatus extends below the feed access opening of the feed chute and wherein the feed catch portion of the feed catch apparatus includes a feed collection space defined by one or more side walls and a bottom wall of the feed catch tray, wherein the bottom wall includes one or more liquid drain holes extending therethrough and a plurality of spaced apart dietary supplement article supporting structures extending thereabove.

17. The animal feeder of claim 16 wherein:

the feed catch portion of the feed catch tray includes opposing side walls, a rear wall and a front wall; and the side walls are tapered such that the front wall is shorter than the rear wall thereby enhancing access to the feed collection space.

* * * * *